Sept. 20, 1971  E. PACINI  3,605,384

BREAKAWAY HALTER

Filed July 17, 1969

INVENTOR:
EDO PACINI
BY:
Joseph B. Gardner
ATTORNEY

United States Patent Office 3,605,384
Patented Sept. 20, 1971

3,605,384
BREAKAWAY HALTER
Edo Pacini, 17494 Ehle St., Castro Valley, Calif. 94546
Filed July 17, 1969, Ser. No. 842,630
Int. Cl. B68b 1/02
U.S. Cl. 54—24                                                  1 Claim

ABSTRACT OF THE DISCLOSURE

A breakaway halter for a horse to enable the animal to free himself therefrom should the halter become entangled in a fence or tree branch, or should a leg of the animal become caught in the halter in making an effort to free himself from such entanglement. The halter includes both a nose strap and a neck strap respectively encircling the nose and neck of the animal, and the neck strap has free end portions adapted to overlie each other when encirling the animal's neck. These free end portions are equipped with stress-releasable means for detachably interconnecting the same; and such releasable means is generally effective to resist separation of the free end portions upon application of longitudinal tensile forces of ordinary value, but when the magnitude of any such force exceeds a predetermined value, separation occurs to free the animal from the halter.

---

This invention relates to a halter for horses and like animals and, more particularly, to a breakaway halter enabling such animal to free itself from the halter should it become entangled therewith or should the halter become entangled in some obstruction.

Horses are generally provided with a halter that comprises a plurality of straps adapted to removably encircle the head and neck portion of the animal to provide a convenient means for leading and tying the animal. The halter when once applied may not be removed for long periods, and it is customary to permit the animal with its halter thereon to graze free in large fields and areas that are often remotely located. As a consequence thereof, it sometimes happens that the halter becomes entangled or ensnared in fences, shrubbery, tree branches and the like whereupon the animal remains confined thereat until found and released once his absence is noted. Further, in an effort to free itself from such ensnarement the animal sometimes has a leg thereof become entangled in the halter, thereupon further making the animal helpless. If the animal's difficulty is not discovered for long periods it can, of course, result in its loss.

In view of the foregoing an object, among others, is to provide an improved halter for animals such as horses, and the like. Another object of the invention is in the provision of an improved halter having breakaway characteristics to enable the animal to extricate himself from the halter by application by tugging or pulling forces thereto of a magnitude likely to be applied by the animal in any effort to free itself from entanglement.

Still another object is that of providing an improved breakaway halter having no disadvantages not suffered by conventional halters, and which breakaway structure is flexible, non-metallic, and does not encumber or irritate the animal in any way. A further object of the invention is to provide an improved breakaway halter as described having a neck strap of definitive length provided with free end portions equipped with stress-releasable means for detachably interconnecting the same to convert the strap into a substantially endless member adapted to encircle the neck of the animal and be confined thereabout; such means when interlockingly engaged being effective to resist separation in normal use but upon application of a longitudinal tensile force thereto exceeding a predetermined magnitude, the free end portions separate to release the halter from the animal.

Additional objects and advantages of the invention, especially as concerns particular features and characteristics thereof, will become apparent as the specification develops.

An embodiment of the invention is illustrated in the accompanying drawing in which.

Figure 1:
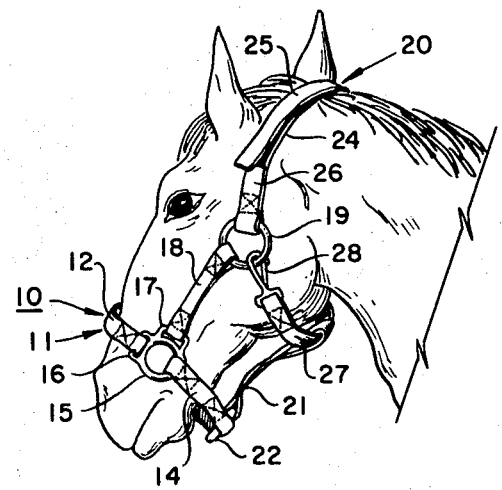
FIG. 1 is a perspective view of the head and neck of a horse having a breakaway halter thereon embodying the present invention.
Figure 2:
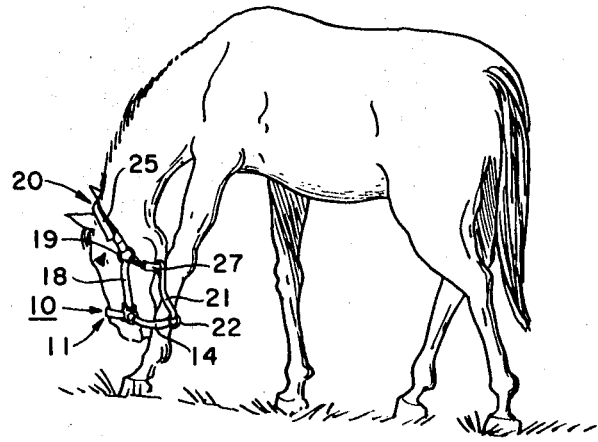
FIG. 2 is a perspective view of the horse showing a leg thereof entangled in the halter.
Figure 3:
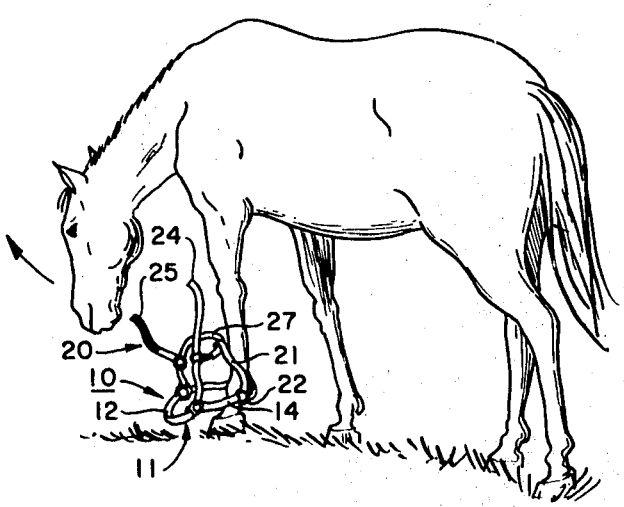
FIG. 3 is a perspective view showing the head and neck released from the halter because of the breakaway characteristics thereof.

A breakaway halter embodying the present invention is shown in its entirety in FIGS. 1, 2 and 3 and is generally denoted with the numeral 10. The halter 10 comprises a plurality of interconnected straps adapted to be removably mounted upon a horse or similar animal in juxtaposition with the head and neck thereof, as illustrated in FIGS. 1 and 2. The purpose of the halter 10 is the same as that of any other halter and, in this respect, perhaps the most significant function thereof is in leading and tying the animal. For the most part then, the halter 10 may be substantially conventional both in structural and functional terms.

In this reference, the halter includes a nose strap 11 adapted to loosely encircle the nose of the animal leaving sufficient clearance so that the mouth can be opened and closed with substantially no interference. The nose strap 11 is formed in two sections comprising an upper nose-covering section 12 and a lower jaw-covering section 14. Generally, the sections 12 and 14 are semicircular and at each pair of adjacent ends they are connected with a ring 15 (only one being shown in the drawings) so as to form a substantially endless strap. In the usual case, all of the straps comprising the halter 10 are formed of a flexible material which may be leather or fabric, and although the strap sections 12 and 14 may be secured to the rings 15 in any suitable manner, this is advantageously accomplished by stitching the strap sections in looped form about the rings as is well-known in the art. It may be observed that the strap section 12 is confined in a translational sense relative to the ring 15 by a special connector section 16 provided thereby. In contrast, the strap section 14 is freely movable about the generally circular ring 15 between the limits established by the connector 16 and by a second connector section 17 angularly spaced therefrom.

Extending rearwardly from the nose strap 11 is a relatively short face strap 18 which at one end is secured to the connector 17 and at its other end is looped about and secured to a ring 19 that is substantially circular and free of obstructions. It will be appreciated that a face strap 18 and ring 19 are provided along each side of the face of the animal, and secured to the rings 19 is a neck strap generally denoted as 20. A short jaw strap 21 extends between the nose and neck straps 11 and 20 and is secured to the former by a ring 22 and may be directly secured to the latter by being looped thereabout so that transverse displacements of the strap 21 are accommodated at its connection with the neck strap.

The neck strap 20 is of definitive length and has free end portions 24 and 25 that are adapted to be detachably interconnected by stress-releasable means that will be described in detail hereinafter. In the particular form shown, the end portions 24 and 25 are adapted to overlie each other in contiguous juxtaposition as seen best in FIGS. 1, 4 and 5. The neck strap 20 is also formed in two sections constituting an upper section 26 adapted to extend behind the neck of the animal, or thereover as illustrated in FIGS. 1 and 2, and a lower section 27 underlying the head and neck of the animal. It is apparent in both FIGS. 1 and 2 that the neck strap 20 hangs somewhat loosely about the neck of the animal along the lower section 27, and although such looseness is necessary for the comfort and convenience of the animal it does create problems, as will be explained subsequently.

The associated end portions of the strap sections 26 and 27 are connected to the respective ring 19 by being looped thereabout and stitched, and since the strap sections are movable along the rings 19 considerable articulation is afforded between the two strap sections 26 and 27 and the other straps comprising the halter. Usually, a releasable fastener 28 is provided so that the halter can be opened to permit it to be mounted upon and removed from the animal and, as shown in FIG. 1, the fastener 28 may be secured to one end of the strap section 27 and be releasably associated with the ring 19.

The stress-releasable means for detachably interconnecting the free end portions 24 and 25 of the neck strap 20 may take various forms, but when interconnected, the strap of the definitive length is converted into a substantially endless member adapted to encircle the neck portion of the animal as shown in FIGS. 1 and 2. The stress-releasable means shown includes cooperative components respectively carried by the free end portions 24 and 25 of the neck strap, and such cooperative components are interlockingly engageable with each other. When interlockingly engaged they are effective to resist separation upon application of a longitudinal tensile force therebetween generally along the length of the strap and endless member formed thereby until the magnitude of such tensile force approximates a predetermined value. When such force value is reached, separation or rupturing of the interconnected end portions 24 and 25 can occur.

Figure 4:
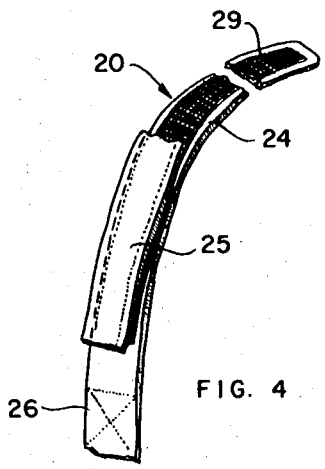
FIG. 4 is a broken perspective view showing the means for detachably interconnecting the free end portions of the neck strap of the halter.
Figure 5:
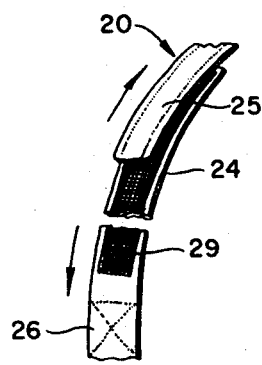
FIG. 5 is a broken perspective view similar to that of FIG. 4 but illustrating the free end portions of the neck strap in the process of being separated one from the other.
Figure 6:
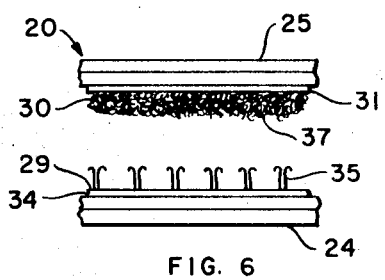
FIG. 6 is an enlarged broken side view in elevation showing portions of the overlapped end portions in spaced apart relation.

In FIGS. 4 and 5, the component carried by the end portion 24 is shown and it is generally designated with the numeral 29. This component is also shown in FIG. 6 as is the component 30 cooperative therewith which is carried by the end portion 25. Although the cooperative components 29 and 30 resist separation when a longitudinal tensile force is applied therebetween, until such force approaches some predetermined value, they are readily separated upon application of a transverse force thereto tending to peel one of the components from the other. More particularly in this respect, if the upper free end portion 25 of the neck strap 20 is grasped at its outer extremity, as viewed in FIG. 1, and is pulled upwardly and rearwardly so as to be peeled from the underlying end portions 24, the components 29 and 30 separate with considerable ease, for example with a pull of just a few pounds. Although the magnitude of the force required to separate the components 29 and 30 by application of a longitudinal tensile force thereto may be varied considerably depending upon requirements, a force value of about 25 pounds is considered optimum for a halter used for a grown horse.

The stress-releasable means comprising the cooperative components 29 and 30 constitutes two strips of material respectively secured to the free end portions 24 and 25 of the neck strap so as to be disposed in contiguous facing juxtaposition when the free end portions are overlapped to form the endless neck encircling strap. Such strips of material are flexible and non-metallic, cannot injure or cause discomfort to the animal, and the cooperative components comprising the same are readily used and manipulated.

Referring to FIG. 6 in particular, it will be seen that the component 30 and strip of material comprised thereby includes a relatively thin backing sheet 31 secured to the end portion 25 in any suitable manner as by means of being stitched, stapled, adhesively, or otherwise fixed along one surface thereof in longitudinal disposition with respect thereto. The component 30 further has a facing 32 attached to the backing sheet 31, and the facing 32 constitutes a relatively high pile nap defining a myriad of looped soft fibers. The component 29 similarly includes a backing sheet 34 fixedly attached to the end portion 24 in longitudinally extending relation therealong, and projecting from the exposed face of the backing sheet 34 are ordered rows of stiff needle-like hooked shaped locking fingers 35 that are turned laterally at their outer ends so as to interlockingly engage the fibrous mass forming the facing 32 when the components 29 and 30 are pressed together. The neck strap 20 may be double layered, as shown in FIG. 6, to increase the strength thereof although this particular construction is not germane to the present invention. Stress-releasable means having the characteristics described is sold in retail outlets under the name "Velcro."

In use of the breakaway halter 10, it is placed upon the horse in the customary manner usually by releasing the fastener 28 (it is assumed that the free end portions 24 and 25 of the neck strap 20 are interlockingly engaged) and slipping the nose strap 11 over the muzzle of the horse, as shown in FIG. 1. The upper section 26 of the neck strap 20 is laid over the back of the horses neck and the fastener 28 is connected with the ring 19, as shown in FIG. 1. Should it be either necessary or desirable to adjust the tightness of the neck strap 20 with respect to the horse, the overlapping free end portion 25 is peeled from the end portion 24 so as to free the same and the two end portions are then pressed together at the desired position of adjustment. The halter is then used in the ordinary manner to lead or tie the animal, and generally then, from the point of view of use the halter 10 is essentially conventional except that the neck strap 20 is adjustable.

As noted hereinbefore, it happens at times that the halter is left on the animal, when it is free to graze unattended, and sometimes when the grazing is permitted in large fields and remote locations, the halter may become caught in a fence or on some other obstruction of a character that makes it difficult for the animal to free itself therefrom. Sometimes in the frenzy of trying to free himself, the animal may get a leg caught in one or the other of the nose strap 11 or neck strap 20, as shown in FIG. 2, and then be totally unable to extricate himself. These events occur with sufficient frequency that it is a matter of concern, and upon occasion an animal in such plight will remain unattended for such a long period that he may actually die.

With the present invention it is unlikely that such extremes will occur because the efforts of the animal either to free himself from some obstruction with which the halter has become entangled or to free his leg from the nose or neck strap will exert sufficient tensile force between the overlapped and interengaged free end portions 24 and 25 of the neck strap that they will be displaced longitudinally relative to each other as shown in FIG. 5, thereby releasing such end portions and permitting the halter to drop from the animal, as shown in FIG. 3. The force necessary to cause such separation of the end portions 24 and 25 may be selected, and in the case of the particular securing means shown and described the magnitude of the force required to effect breakaway can be decreased by reducing the length of the components 29 and 30 in engagement with each other and vice versa. As indicated hereinbefore a breakaway force requirement of the order of 25 pounds as has been found to be adaquate for the average full grown horse to permit the halter 10 to function in a conventional manner yet permit separation of the end portions of the neck strap 20 when the horse is attempting to extricate himself from the position shown in FIG. 2 or from some other situation in which the halter is entangled in an obstruction.

While in the foregoing specification an embodiment of the invention has been disclosed in considerable detail for purposes of making a complete disclosure thereof, it will be apparent to those skilled in the art that numerous changes will be made in such details without departing from the spirit and principles of the invention.

What is claimed is:

1. A method for preventing injury of the head and neck of a horse comprising the step of providing a head harness including a separate neck strap portion having two overlapping joined ends, joining one end portion comprising a relatively high pile nap surface defined by a myriad of looped soft fibers, to a second end portion defined by a backing of opposed rows of stiff hook shaped needle-like locking fingers, normally separating said ends by a transverse peeling force away from one another providing emergency removal capabilities when an unexpected great force is applied by the horse axially to said strap end portions, so the portions are ruptured apart to provide a safety release of the head harness.

References Cited

UNITED STATES PATENTS

| | | | |
|---|---|---|---|
| 2,932,930 | 4/1960 | Ray | 54—24 |
| 3,131,674 | 5/1964 | Dalton | 119—106 |
| 3,160,143 | 12/1964 | Gray | 119—96 |
| 3,176,684 | 4/1965 | Walsh | 128—75 |
| 3,263,399 | 8/1966 | Faragher | 54—6 |
| 3,338,028 | 8/1967 | Freeman | 54—82 |

ALDRICH F. MEDBERY, Primary Examiner

U.S. Cl. X.R.

119—96